F. E. QUEENEY.
CONTROLLING MECHANISM FOR ELECTRIC VEHICLES.
APPLICATION FILED NOV. 30, 1914.
1,199,923.
Patented Oct. 3, 1916.
2 SHEETS—SHEET 1.
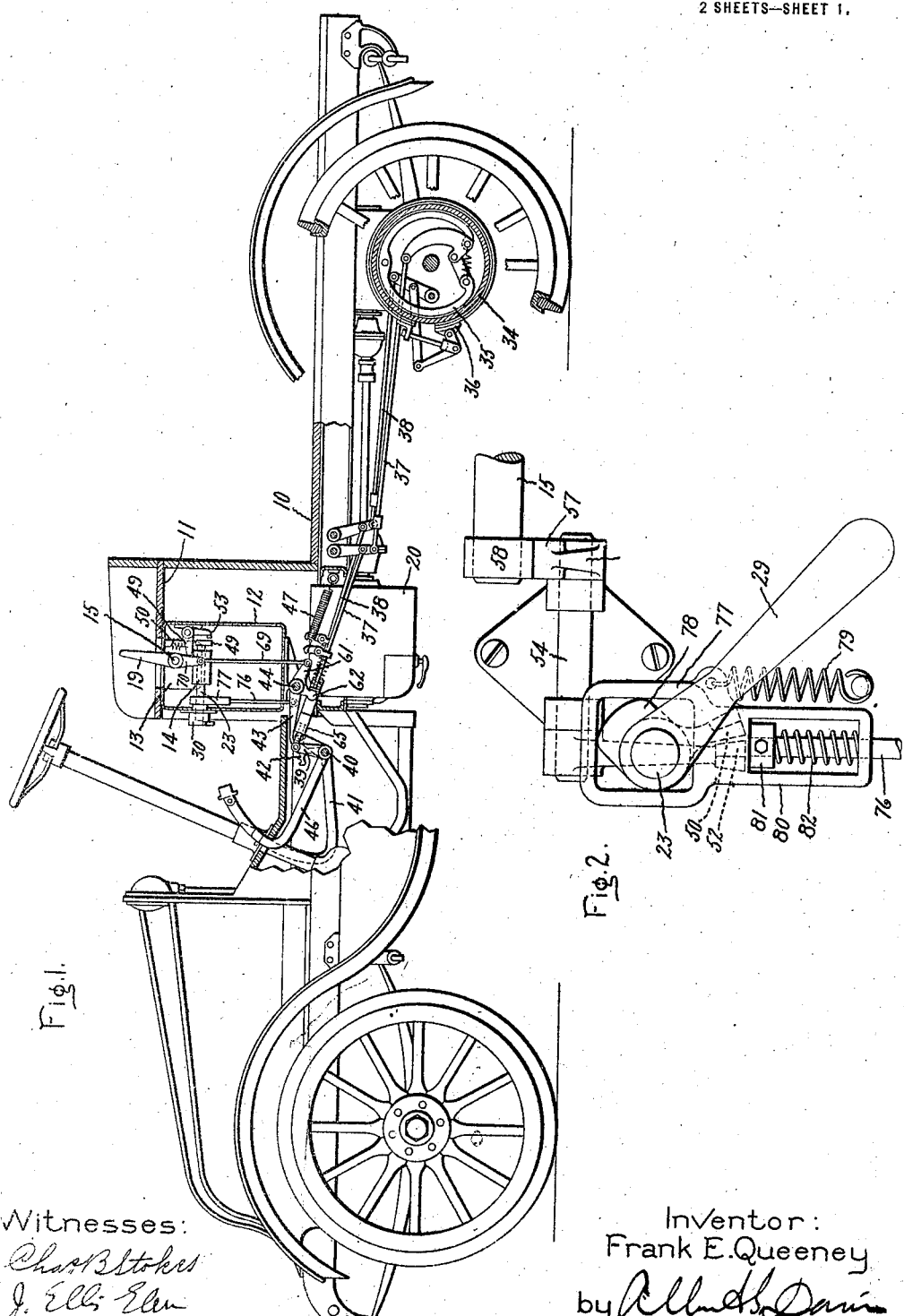
Witnesses:
Chas B Stokes
J. Ellis Elen
Inventor:
Frank E. Queeney
by Albert S Davis
His Attorney.

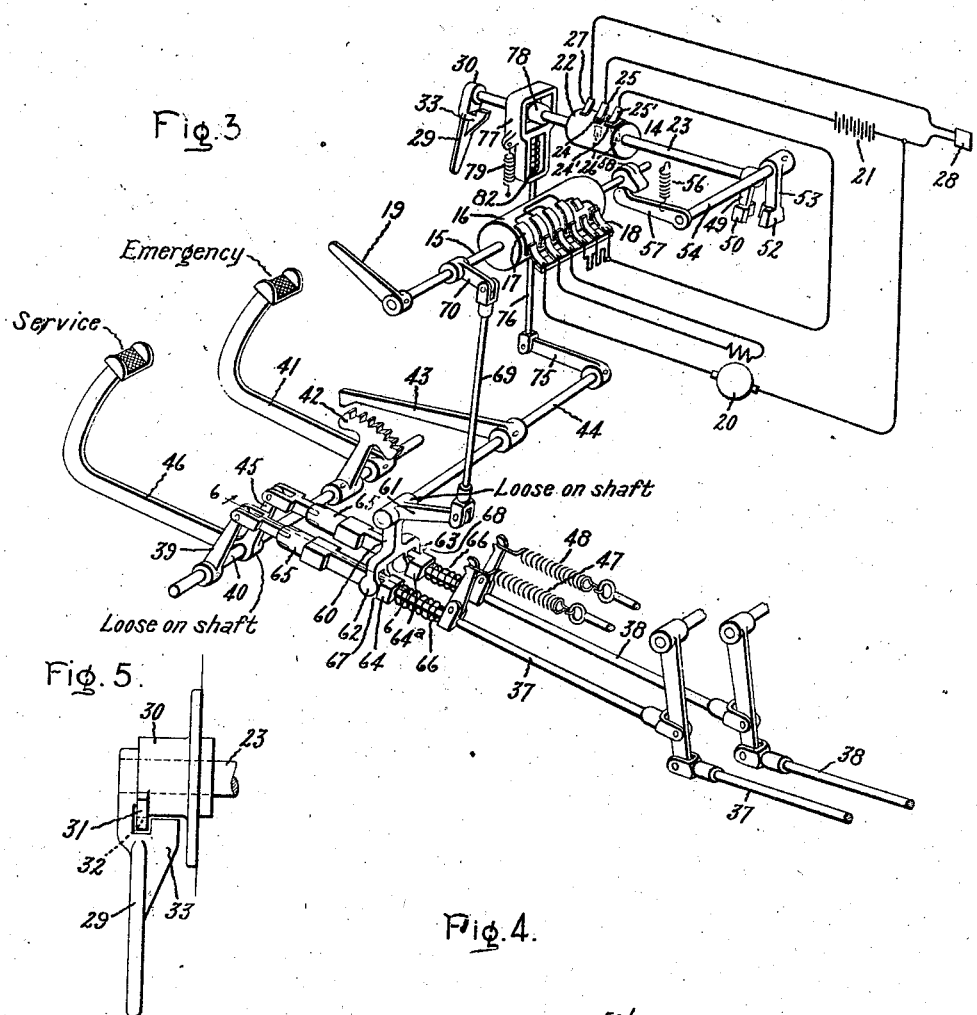

UNITED STATES PATENT OFFICE.

FRANK E. QUEENEY, OF NEW YORK, N. Y., ASSIGNOR TO GENERAL VEHICLE COMPANY INCORPORATED, A CORPORATION OF NEW YORK.

CONTROLLING MECHANISM FOR ELECTRIC VEHICLES.

1,199,923.  Specification of Letters Patent.  Patented Oct. 3, 1916.

Application filed November 30, 1914. Serial No. 874,748.

*To all whom it may concern:*

Be it known that I, FRANK E. QUEENEY, a citizen of the United States, residing at New York, in the county of Queens, State of New York, have invented certain new and useful Improvements in Controlling Mechanism for Electric Vehicles, of which the following is a specification.

The present invention relates to electrically driven motor vehicles, and particularly to those which are propelled by means of energy derived from storage batteries or other source of power carried on the vehicle.

For controlling the operation of electric vehicles it is customary to provide a controller for regulating the application of energy to the motors, a running or cut-out switch for cutting off the power from the controller, and a suitable brake or brakes for braking the vehicle.

In connection with such vehicles great waste of energy and damage to the vehicle, and often serious accidents may result from carelessness or neglect on the part of the operator, or from curious persons or children tampering with the controllers and brakes. For example, when the car is running the operator may apply the brake while the controller is still on, thus wasting energy. Or he may carelessly turn on the controller to start the car after it has been standing with the brake or brakes on, without first releasing them, thus permitting an excessive current to flow through the motors which places a great strain on them and sometimes results in their burning out. Children, or even older persons tampering with the vehicle when it is left standing may accidentally start it going resulting in its running away, and often in serious accidents. Or they may, in tampering with it, leave it with the controller partly or wholly on and the operator, overlooking this, may close the running switch without first returning the controller to neutral or off position, which will result in an excessive flow of current through the motors causing the car to lunge forward with possible injury to both it and the driver.

The object of the present invention is to provide an arrangement of interlocking among the controller, cut-out switch, and braking mechanism of an electric vehicle which will effectually guard it from improper operation and from injury due to carelessness or neglect on the part of the operator, and which will positively prevent a person tampering with the vehicle from accidentally starting it in operation.

For a consideration of what I believe to be novel and my invention, attention is directed to the accompanying description and claims appended thereto.

Referring to the drawings, Figure 1 is a side view of an electric vehicle, partly in section, with my improved interlocking arrangement applied thereto; Fig. 2 is a front view of the cut-out or running switch and adjacent mechanism; Fig. 3 is a perspective view, more or less diagrammatic in nature, of the controller, running switch and brake actuating means showing the interlocking arrangement and a partial diagram of the electrical connections; Fig. 4 is a diagrammatic illustration of the interlocking arrangement between the controller and running switch; Fig. 5 is a side view of the running switch handle in place on the vehicle, and Fig. 6 is a section on line 6—6, Fig. 3.

In the drawing 10 indicates the body of an electric vehicle and 11 the driver's seat. Beneath the seat and extending longitudinally thereof is a metallic casing 12 within which is arranged the controller 13 and the running or cut-out switch 14. The controller and the running or cut-out switch may be of any suitable structure and they are arranged in the circuits of the motor or motors in any approved manner. The arrangement is shown more or less diagrammatically in Fig. 3. Referring particularly to this figure, the controller is shown as comprising a shaft 15 upon which is mounted a controller drum 16 carrying suitable contact segments 17 for engagement with the contact fingers 18. There are two sets of contact segments on the drum, one for forward operation and the other for reverse operation. Only one set, the forward, is shown in the drawings, but the other set, which is arranged on the opposite side of the drum, will be generally similar thereto. The neutral position of the controller is between the two sets of contact segments as indicated on the end of the drum. A movement of the controller drum in an anti-clockwise direction will bring the forward contact segments into engagement with the contact fingers and a movement in a clockwise direction will bring the reverse contact segments into engagement with the contact fingers. 19 indicates the operating handle for the controller. It is fast to the shaft 15 and projects alongside the driver's seat as shown in Fig. 1, so as to be within ready reach of the operator. The handle is preferably arranged so that when the controller is in neutral position it extends substantially vertical. A movement forward, i. e., anti-clockwise, then turns the controller drum for forward operation of the vehicle, and a movement backward; i. e., clockwise, turns the controller drum for reverse opeartion. In the simplified wiring diagram shown in Fig. 3, 20 indicates the motor or motors and 21 the source of energy. The circuit arrangement is obvious from an inspection of the drawing, and as its specific nature as well as the type of controller used is well known and forms no part of the present invention, further description is believed to be unnecessary.

The running or cut-out switch 14 is arranged in the circuit preferably between the source of energy 21, here shown as a storage battery, and the controller as shown. It comprises preferably a drum 22 mounted on shaft 23 and carrying suitable contact segments 24 and 24' which engage contact fingers 25 and 25'. When the contact segments are out of engagement with the fingers the circuit is open and the controller is rendered dead. The running switch also performs the function of a charging switch. In other words, it is a combined running and charging switch. To this end its drum 22 has two contact segments 26 shown in dotted lines which, when the switch is turned to charging position, engage contact fingers 25 and 27. This connects the storage battery to the charging plug 28 as will be readily understood. 29 is a removable operating handle for the running switch. It has three positions, "open", "closed" and "charging" and is arranged so that it may be removed from the shaft 23 only when the switch is in "open" position. As shown in Fig. 1, the end of the switch shaft 23 projects through the casing 12 and terminates in a socket 30 having a depending lip 31 in which is a slot 32, extending axially, as shown in dotted lines in Fig. 5. The handle has a finger 33, the end of which takes behind the lip 31 when the handle is in place. When in open position this finger is opposite the slot 32 and the handle can then be removed. When in other than the "open" position, the finger engages with the lip 31 and acts to prevent the removal of the handle.

The vehicle is shown as being equipped with both emergency and service brakes. 34 (Fig. 1) indicates a brake drum and 35 and 36 are interior and exterior braking members of usual structure and operated through the brake rods 37 and 38. It will be understood that each of the rear wheels will be provided with brakes, as is usual and that they will be operated through the same brake rods. Either one of these brakes may be the emergency and the other the service brake. In the present instance the inner braking member 35 which is of the expanding type is the emergency brake. Its operating rod 37 is connected to an arm 39 fixed on a shaft 40 which extends laterally across the vehicle body below the floor in front of the operator's seat. Fixed on this shaft is the emergency brake operating lever 41, here shown as a foot lever. Downward pressure on this foot lever will oscillate the shaft 40 thus turning the arm 39 in an anti-clockwise direction and pulling the brake rod 37 to apply the brake. The emergency brake is provided with a brake-lock comprising a toothed segment 42 fixed to the shaft 40 and a pawl 43 fixed on a shaft 44. The end of the pawl is adapted to be forced into engagement with the teeth of the toothed segment. It is to be noted that the emergency brake foot lever 41, the toothed segment 42, and the arm 39, are each fixed to the shaft 40 and oscillate together. From one point of view the foot lever 41 and arm 39 comprise the two arms of a bell crank lever.

The outer braking member 46, which is the service brake, and is of the foot type, has its brake rod 38 connected to one arm 45 of a bell crank lever, the other arm 46 of which forms the brake operating lever, in this instance also a foot lever. This bell crank lever is loosely mounted on the shaft 40 adjacent the emergency brake foot lever 41. It is mounted on this shaft merely as a matter of convenience, and since it is loose on the shaft its operation is wholly independent of that of the emergency brake mechanism. The brakes are biased to off position by means of suitable springs 47 and 48 as shown.

The parts so far described may be taken as typical of the controlling mechanism for an electric vehicle. Their operation is well understood and needs no description.

I will now describe the interconnecting mechanism among the various controlling elements, which mechanism goes to make up my invention. It may be considered as made up of three parts—first, the interconnection between the controller and the running or cut-out switch; second, the interconnection between the controller and the brakes; and third, the interconnection between the running or cut-out switch and the brake lock. These three parts each have novel features in themselves which will be pointed out in the following description. They also all coöperate with each other in producing the results aimed at by the invention.

The interconnection between the controller and the running or cut-out switch is in the nature of a locking device for locking the switch in open position, which locking device can be, or is, unlocked or rendered ineffective only when the controller is in neutral position. The arrangement is such that whenever the switch is moved from closed to open position it will be locked open. Before it can be released the controller must be in neutral position. The locking device is preferably arranged so that the movement of the controller from either forward or reverse position to neutral position unlocks it. In the form illustrated the locking device comprises an arm 49 mounted on the shaft 23 of the running switch and moving therewith. The outer end of the arm has an enlarged rectangular head 50 formed with a beveled face 51, best shown in Fig. 4. Located in the path of movement of the enlarged head 50 is a similar head 52 carried by an arm 53 which is fast on an oscillatory or intermediate shaft 54. The head 52 has a beveled face 55 which is located opposite to and in the path of movement of the beveled face 51. This is best shown in Fig. 4. The enlarged heads 50 and 52 form the two engaging elements of a locking device. The shaft 54 is arranged at substantially right angles to the shaft 23, and by oscillating it the locking element 52 may be moved out of and into the path of movement of the locking element 50. The locking element 52 is biased to a position in the path of movement of the element 50 by means of a suitable spring 56 fastened to an arm 57 fixed on the shaft 54. When the running switch is turned from closed to open position the beveled face 51 of locking element 50 engages with the beveled face 55 of locking element 52 pushing it aside and passing beyond it. The spring 56 then returns the locking element 52 back into the path of movement of locking element 50. This locks the switch open and it cannot be closed until locking element 52 is moved out of the path of the element 50 by some exterior means, as the beveled faces no longer oppose each other. Referring to Fig. 4, the locking element 50 is shown in full lines in the position it occupies with reference to locking element 52, when the running switch is closed and the locking device operative; and in dotted lines at 50ª and 50ᵇ in the positions it occupies relative thereto when in open position and charging position.

The means for rendering the locking device ineffective when the controller is moved from either forward or reverse position to neutral position comprises a double faced pointed cam 58 fixed to the controller shaft 15 and engaging with the end of lever arm 57. When the controller is in neutral position the nose of the cam will press on arm 57 and hold locking element 52 out of the path of movement of locking element 50. The running switch is then free to be closed. Movement of the controller in either direction from neutral position will release the arm 57 permitting the spring 56 to return the locking element 52 to operative position. By this arrangement it will be clear that it is impossible to close the running switch unless the controller is in neutral position, and on the other hand that the locking means does not interfere with the normal operation of the controller.

The interconnection between the controller and the brakes comprises an arrangement whereby the controller will be moved from either forward or reverse position to neutral position whenever either brake is applied. And in the opposite sense it prevents the controller from being moved to either forward or reverse position so long as either brake is applied. At the same time the arrangement is such that when the brakes are released the operation of the controller in either forward or reverse direction is in no way affected, and when the controller is in neutral position the brakes are operable wholly independently thereof.

Referring particularly to Fig. 3, 60 and 61 are the two arms of a bell crank lever loosely pivoted on the shaft 44. This is the same shaft which carries the locking pawl 43. It should be borne in mind, however, that since the bell crank lever is loose on it, while the pawl is fixed, the one does not interfere with the operation of the other. So far as the operation is concerned, they could as well be on separate shafts. They are placed on the same shaft as a matter of simplicity of construction. The arm 60 has two forks 62 and 63 which engage with abutments 64 and 64ª on the brake rods 37 and 38. These abutments are in the form of sleeves loosely mounted on the rods and yieldingly held against the enlarged heads 65 into which the brake rods are fastened by means of springs 66, (see Fig. 6). The sleeves are cut away on the sides substantially throughout their length as shown forming at one end the shoulders 67 and 68. The forks straddle the cut away part, and are adapted to be engaged by the shoulders. This provides in substance a lost motion connection between the sleeves and the lever arm 60. The other arm 61 of the bell crank lever is pivotally connected to one end of the rod 69, the other end of which is pivotally connected to the controller, preferably through an arm 70 fast on the controller shaft 15. The pivotal points of connection of the rod 69 to the arm 61 and to the controller are such that when the controller is in neutral position they will be in alinement with the shaft 15 and to one side of the shaft 44. This is best shown in Fig. 1. The controller is here shown in neutral position and it will be seen that the shaft 15, the arm 70, and the rod 69 are in vertical alinement, and that the shaft 44 is to one side thereof. By this arrangement, a movement of the controller handle in either direction moves the bell crank lever 60, 61 in the same direction. That is, starting from the position of rest shown in Fig. 1, a movement of the controller handle 19 either clockwise or anti-clockwise will move the bell crank 60, 61 anti-clockwise. It is due to this arrangement that a movement of either brake lever to apply the brakes will move the controller to neutral position irrespective of whether it is in forward or reverse position. In Fig. 3 the controller is shown as being in position for full speed ahead and both brakes are necessarily released. The forks 62 and 63 are in engagement with the shoulders 67 and 68 respectively. If now either brake be applied the shoulders will press on the forks, rocking the bell crank lever 60, 61 in a clockwise direction and pulling the controller to neutral position. Were the controller in full reverse position, the connecting parts 69 and 70 would occupy the same relative position as shown in Fig. 3, except that the arm 70 would be on the other side of the shaft 15, and a movement of either brake lever to apply its brake would in the same manner pull on rod 69 to throw the controller to neutral position.

It will be noticed that when the controller is in neutral position and the rod 69 and arm 70 are alined as shown in Fig. 1, that it is impossible for the bell crank lever 60, 61 to oscillate farther in a clockwise direction, no matter how much pressure is put on the brake lever. This necessitates making the abutments 63 and 64 yielding so as to insure that the brake can be fully applied. After the controller is fully off and the bell crank lever 60, 61 has moved as far as possible, if the brake is then not fully applied its spring 66 will yield and the brake rod will move further while the abutment will be held by the forks of the bell crank lever. This arrangement avoids the necessity of having to carefully adjust the brakes with reference to their connection to the controller, and also takes care of any wear of the brake shoes or bands. It also avoids having to adjust the controller mechanism when the brakes are adjusted. It is also to be noticed that so long as either brake is applied the controller will be held in neutral position, due to the abutments engaging the forks 62 and 63.

By reason of the lost motion connection already referred to, it will be evident that when the controller is in neutral position and neither of the brakes is applied, that the shoulders 67 and 68 are not in engagement with forks 62 and 63. Under these circumstances, the controller can be operated in either direction wholly independently of the brakes. Likewise the brakes can be operated wholly independently of the controller.

The interconnection between the cut-out or running switch and the brake lock comprises an arrangement whereby when the switch is moved to open position, the locking members of the brake lock will be moved into engagement. They are preferably arranged to be relatively inaccessible, as by arranging them under the floor of the vehicle, so that the only way they can be actuated is by a movement of the running switch handle to open position. This insures that whenever the brake or brakes are locked, the running switch is open. In other words, it makes it necessary for the operator to open the running switch in order to leave the vehicle standing with the brake or brakes locked. It also makes it impossible for a person tampering with the car to release the brakes, which would result in the starting of the car were it standing on a down grade. The connection between the running switch and brake-lock is preferably a yielding one. That is, it is arranged so that while a movement of the switch from closed to open position will cause the locking members to move into engagement, the switch may be moved from open to closed position without releasing the brake lock. One object of this is to facilitate starting, particularly when on a grade. Another is that it permits the pawl to yield so that the brake may be applied and locked after the running switch is opened.

In the arrangement shown, 75 is an arm fixed on the shaft 44 with the locking pawl 43. The outer end of the arm is pivotally connected to one end of a rod 76, the other end of which is yieldingly connected to the cut-out switch in the manner already referred to. This yielding connection comprises a rectangular frame 77, Fig. 2, which surrounds the shaft 23 of the running switch. Inside the frame is a cam 78 which is fixed on the shaft 23. The frame is pulled downward into contact with the cam by a suitable spring 79. The rod 76 passes through a guide member 80 on the frame and terminates in an enlarged head 81 which rests against the lower side of the frame 77. Between the head and the guide member is a spring 82. In Fig. 2 these parts are shown in the positions they occupy when the cut-out switch is closed and the brake lock is released. The spring 79 will be under tension. If now the running switch handle 29 is moved to open circuit position, i. e., to vertically downward position, the cam 78 will move away from the top of the frame 77 and spring 79 will cause the frame to move downward following the outlines of the cam. This will force rod 76 downward, oscillating the shaft 44 and moving the pawl 43 into position to engage the teeth of segment 42. If the emergency brake has already been applied the pawl will engage the segment and lock the brake. If it has not already been applied, as soon as it is, it will be locked, the pawl slipping over the teeth of the segment. When the handle 29 is moved to again close the running switch, the cam 78 will force the frame 77 upward. The teeth of the brake locking segment 42 are undercut so that they hold the pawl, particularly when the brake is set up hard, as is well understood. Upon the upward movement of the frame 77, therefore, it moves away from the head of rod 76 and the guide member 80 slides on the rod and puts the spring 82 under greater compression. This closes the switch but ordinarily leaves the brake still set. When it is desired to release the brake after the running switch is closed, the operator will press on the foot lever so as to release the frictional engagement between the segment and the pawl. The spring 82 will then force rod 76 upward to move the pawl 43 from engagement with the segment 42. In the present instance the brake locking means is shown as being applied to the emergency brake, but it will be understood that it may be applied to either the emergency or the service brake or to both.

Referring to Fig. 1, it will be seen that the brake locking segment 42 and the pawl 43 are located under the floor of the car and the rod 76, which connects them to the running switch and the operating parts therefor are under the seat and within casing 12. This renders these parts ordinarily inaccessible so that the only way the brake can be locked is by turning the handle 29 to open the running switch. This insures that the operator will have opened the running switch when he leaves the vehicle with the brake locked in applied position.

In operation when the vehicle is running, the running switch will be closed, the brakes will be released, and the controller will be free for movement in either the forward or reverse direction. When it is desired to stop the vehicle, the controller will first be moved to neutral position and the brake or brakes then applied. Should the driver for any reason apply either brake without first moving the controller to neutral position, the act will, in itself, move the controller to neutral position whether it be in forward or reverse position and will maintain it there so long as the brake is applied. When it is desired to leave the vehicle standing the operator after having first stopped it in the usual manner will open the running switch and remove the operating handle to take with him. If the vehicle is on level ground for instance, the brake need not necessarily be locked. No one could possibly start the car by tampering with it as the running switch is open and the handle removed. The driver when desiring to again start the vehicle will first make sure that the controller is in neutral position and then return the handle 29 to the running switch shaft 23 and close the switch. Should the controller for any reason be left in on position, or should some person tampering with the car move it to an on position, either forward or reverse, when the vehicle is left standing with the running switch open, the locking means for the running switch would then be operative and lock the running switch open. Should the driver in starting the car fail to note that the controller was not in neutral position and attempt to close the running switch, he would find it locked open. Before he could close it he would first have to unlock it by moving the controller to neutral position.

If it is desired to lock the brake in applied position upon leaving the car, which would ordinarily be the case, the driver may first apply the brake, and, while holding it applied, open the running switch, or he may first open the running switch and then apply the brake. Under these conditions not only is the brake locked in its applied position but the controller is also locked in its neutral position owing to its connection with the brakes. Now when the operator desires to start the car, he will apply the running switch handle and turn it to close the switch. Owing to the yielding connection between the brake lock and the running switch as already explained, this will not raise the pawl 43 from the segment 42, but it will remain in position holding the brake and controller locked. This permits the operator to close the running switch before he gets into the car if he desires to do so. When he is ready to start, he presses on the brake lever thus automatically releasing the lock, then as soon as he releases the brake he may move the controller to apply power. It will be noted that after the pawl 43 is released, unlocking the brake, that the controller is still held in neutral position so long as the brake is on.

By the interconnecting arrangements as above described, it will be seen that the same coöperate with each other to render the operation of the vehicle safe in the hands of an ordinary driver, making it impossible for him to thoughtlessly operate the car in an improper manner, and that they also effectually guard the vehicle from accident due to children or older persons tampering with it.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In an electric vehicle, the combination of a controller, a running switch, a brake, locking means for preventing the running switch from being moved from open to closed position, means operated by the controller for rendering said locking means ineffective when the controller is in neutral position, and means connecting the brake and controller for returning the controller to off position when the brake is applied.

2. In an electric vehicle, the combination of a controller, a service brake, an emergency brake, and connecting means between said brakes and controller whereby when either of said brakes is applied the controller will be returned to neutral position.

3. In an electric vehicle, the combination of a controller, an operating handle therefor, said handle being movable in one direction from vertical position to move the controller for forward operation and in the opposite direction to move the controller for reverse operation, a brake, brake operating means, and connections between the brake operating means and the controller for returning it from either a forward or a reverse position to neutral position when the brake is applied.

4. In an electric vehicle, the combination of a controller having a shaft, an operating handle thereon which is movable in opposite directions from neutral position for forward and reverse operation, a brake, brake operating mechanism, a pivoted lever, a yielding abutment carried by the brake operating mechanism for moving said lever, an arm on the controller shaft, and a link pivotally connecting said lever and arm, said link being in line with the arm when the controller is in off position.

5. In an electric vehicle, the combination of a pivotally supported controller which is capable of moving forward and reverse from a neutral position to control the vehicle, an operating means therefor, a brake, brake operating means, and a means responsive to a brake setting movement of the brake operating means for returning the controller from its forward and reverse positions to neutral.

6. In an electric vehicle, the combination of a pivotally supported controller which is capable of forward and reverse movements on opposite sides of a neutral position, an actuator for the controller, a brake, a means which always moves in one direction to apply the brake, and a connection between the controller and the brake applying means which, as the latter moves to apply the brake, returns the controller to neutral irrespective of the direction of movement imparted to it by the actuator.

7. In an electric vehicle, the combination of a pivotally supported controller which is capable of forward and reverse movements on opposite sides of a neutral position, an actuator for the controller, a brake, means which always moves in one direction to apply the brake, a means receiving motion from the brake applying means for restoring the controller to neutral from its positions on both sides thereof, and a device interposed between the restoring means and the brake applying means which permit the latter to move after it has restored the controller to neutral.

8. In an electric vehicle, the combination of a controller having a shaft, an operating handle thereon which is movable in opposite directions from neutral position for forward and reverse operation, a brake, brake operating mechanism, a pivoted lever, a yielding abutment carried by the brake operating mechanism for moving said lever, and a link connecting the controller mechanism and the lever, the points of connection being in line with the controller shaft when the controller is in neutral position and to one side of the pivot point of said lever.

9. In an electric vehicle, the combination of a running switch, a brake, a lock therefor, and means yieldingly connecting the lock and the switch which moves the lock to operative position to lock the brake when the running switch is opened and permits the running switch to be closed without releasing the lock.

10. In an electric vehicle, the combination of a running switch, a brake, a lock therefor comprising a toothed member and a pawl, and means yieldingly connecting the pawl and the switch which moves the pawl to operative position to engage the member when the running switch is opened and permits the running switch to be closed without releasing the pawl.

11. In an electric vehicle, the combination of a running switch, a brake, a lock therefor, and means yieldingly connecting the lock and the switch, said yielding means comprising a cam moved by the switch, a member movable by the cam, a spring for holding the member in engagement with the cam, and a rod connected at one end to the lock and yieldingly connected at the other end to the member.

12. In an electric vehicle, the combination of a controller, a running switch, a brake, a brake lock, means connecting the running switch and the brake lock whereby the lock will be moved to operative position when the running switch is opened, and means connecting the controller and brake whereby when the brake is locked in applied position the controller will be held in neutral position.

13. In an electric vehicle, the combination of a controller, a running switch, locking means for locking the running switch in open position comprising a locking element movable with the running switch, a second locking element biased to a position in the path of movement of the first locking element, said second locking element being adapted to yield to permit the first to pass it when the running switch is moved to open position but to hold it from movement in the reverse direction, and means for moving the said second locking element out of the path of the first when the controller is moved to neutral position.

14. In an electric vehicle, the combination of a controller, a running switch, a brake, a brake lock, means connecting the controller and brake for throwing the controller to neutral position when the brake is applied, means connecting the running switch and the brake lock for moving the lock to operative position when the running switch is opened, means for locking the running switch in open position, and means operated by the controller for rendering said last named locking means ineffective when the controller is in neutral position.

15. In an electric vehicle, the combination of a controller, a running switch, a brake, a brake lock, means connecting the controller and brake for throwing the controller to neutral position when the brake is applied, means joining the running switch to the brake lock for moving the lock to operative position when the running switch is opened, said last named means comprising a yielding connection which permits the switch to be closed without releasing the brake lock means for locking the running switch in open position, and means operated by the controller for rendering said last named locking means ineffective when the controller is in neutral position.

16. In an electric vehicle, the combination of a controller, a running switch, a brake, a brake lock, means connecting the running switch to the brake lock so that when the running switch is moved to open position the lock will be operative to lock the brake, means for locking the running switch in open position, and means controlled by the controller for rendering said switch locking means ineffective when the controller is in neutral position.

17. In an electric vehicle, the combination of a controller, a running switch, a brake, a brake lock, means connecting the running switch to the brake lock so that when the running switch is moved to open position the lock will be operative to lock the brake, said means comprising a yielding connection which permits the switch to be closed without releasing the brake lock, means for locking the running switch in open position, and means operated by the controller for rendering said switch locking means ineffective when the controller is in neutral position.

18. In an electric vehicle, the combination of a running switch comprising a shaft and a contact drum, a brake, a brake lock, a rod connected at one end to the brake lock, and means for connecting the other end of the rod to the running switch shaft, said means comprising a frame surrounding the shaft, a cam fixed to the shaft within the frame, means for biasing the frame into engagement with the cam, and means yieldingly connecting the end of the rod to the frame.

19. In an electric vehicle, the combination of a controller, a brake, a brake rod, a yielding abutment on the brake rod, a lever having one arm in engagement with said abutment, an arm connected with the controller, and a rod connecting the other arm of the lever to the arm on the controller, the arm on the controller and the arm of the lever to which the rod is connected being so arranged that when the controller is in neutral position the former is vertical and the latter is at an angle to the vertical whereby a movement of the controller in either direction will oscillate the lever in the same direction.

In witness whereof, I have hereunto set my hand this twenty fourth day of November, 1914.

FRANK E. QUEENEY.

Witnesses:
W. C. ARMSTRONG,
JAS. A. ALLEN.